United States Patent
Andreasson et al.

(10) Patent No.: US 12,338,336 B2
(45) Date of Patent: Jun. 24, 2025

(54) THERMALLY EXPANDABLE CELLULOSE-BASED MICROSPHERES

(71) Applicant: NOURYON CHEMICALS INTERNATIONAL B.V., Arnhem (NL)

(72) Inventors: Bo Andreasson, Sundsvall (SE); Roel Wijtmans, Kvissleby (SE); Anna Larsson-Kron, Sundsvall (SE); Malin From, Njurunda (SE); Ana López Cabezas, Uppsala (ES); Marcus Ruda, Rimbo (SE); Paula Martirez, Stockholm (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 792 days.

(21) Appl. No.: 17/302,767

(22) PCT Filed: Nov. 12, 2019

(86) PCT No.: PCT/EP2019/081076
§ 371 (c)(1),
(2) Date: May 12, 2021

(87) PCT Pub. No.: WO2020/099440
PCT Pub. Date: May 22, 2020

(65) Prior Publication Data
US 2022/0363859 A1    Nov. 17, 2022

(30) Foreign Application Priority Data
Nov. 13, 2018    (EP) .................................. 18205826

(51) Int. Cl.
*C08J 9/16*    (2006.01)
*C08J 9/14*    (2006.01)

(52) U.S. Cl.
CPC ............... *C08J 9/16* (2013.01); *C08J 9/141* (2013.01); *C08J 2203/142* (2013.01); *C08J 2203/22* (2013.01); *C08J 2301/08* (2013.01)

(58) Field of Classification Search
CPC ........ C08J 9/16; C08J 9/141; C08J 2203/142; C08J 2203/22; C08J 2301/08
(Continued)

(56) References Cited

U.S. PATENT DOCUMENTS 3,615,972 A    10/1971    Morehouse, Jr. et al.
7,846,987 B2 *  12/2010   Handa ..................... C08J 9/142
                                                                   521/97

(Continued)

FOREIGN PATENT DOCUMENTS

CN    103992487 A    8/2014
EP    2204428 A1    7/2010
(Continued)

OTHER PUBLICATIONS

Audery Bonnefond et al, "Effect of the Incorporation of Modified Silicas on the Final Properties of Wood Adhesives" Macromolecular Journals, 2013, pp. 527-537, vol. 7, Spain.
(Continued)

*Primary Examiner* — Michael M. Bernshteyn
(74) *Attorney, Agent, or Firm* — Lorenz & Kopf, LLP (57) ABSTRACT

The disclosure relates to thermally expandable microspheres comprising a polymeric shell surrounding a blowing agent-containing hollow core, the polymer shell comprising a carboxylate-functionalised cellulose having a glass transition temperature (Tg) of at least about 125° C. The disclosure also relates to a method for preparing such thermally expandable microspheres, comprising mixing an aqueous phase that optionally comprises an emulsifier with an organic phase that comprises an organic solvent, a blowing
(Continued)

agent and a carboxylate-functionalised cellulose having a Tg of at about least 125° C., to form a microsphere dispersion.

20 Claims, 6 Drawing Sheets (58) Field of Classification Search
USPC .......................................................... 521/59
See application file for complete search history.

(56) References Cited

U.S. PATENT DOCUMENTS

| 10,023,712 | B2 | 7/2018 | Sakabe et al. | |
|---|---|---|---|---|
| 2003/0008932 | A1* | 1/2003 | Soane | C08J 9/32 |
| | | | | 521/56 |
| 2003/0008943 | A1* | 1/2003 | Slone | C09D 5/027 |
| | | | | 524/308 |
| 2008/0146686 | A1* | 6/2008 | Handa | C08J 9/142 |
| | | | | 521/58 |
| 2011/0123807 | A1 | 5/2011 | Jun et al. | |
| 2013/0040125 | A1* | 2/2013 | Eberstaller | C08J 9/0038 |
| | | | | 428/407 |
| 2013/0040235 | A1* | 2/2013 | Takatsuna | B82Y 30/00 |
| | | | | 977/773 |

FOREIGN PATENT DOCUMENTS

| KR | 1020110058095 A | 6/2011 |
|---|---|---|
| WO | 0037547 A2 | 6/2000 |
| WO | 2004035474 A1 | 4/2004 |
| WO | 2004056549 A1 | 7/2004 |
| WO | 2007091960 A1 | 8/2007 |
| WO | 2012151596 A2 | 11/2012 |
| WO | 2014198532 A1 | 12/2014 |
| WO | 2015178329 A1 | 11/2015 |
| WO | 2016091847 A1 | 6/2016 |

OTHER PUBLICATIONS

Takahiro Ohno et al, "Cellulose alkyl ester/vinyl polymer blends: effects of butyryl substitution and intramolecular copolymer composition on the miscibility", 2006, pp. 245-259, vol. 13, Japan.

R1: Fang Liang, Pharmaceutical Polymer Materials Science, Beijing: China Medical Science and Technology Press, 4th edition, pp. 108-109, Aug. 31, 2015.

* cited by examiner

THERMALLY EXPANDABLE CELLULOSE-BASED MICROSPHERES

CROSS-REFERENCE TO RELATED APPLICATION

This application is a U.S. National-Stage entry under 35 U.S.C. § 371 based on International Application No. PCT/EP2019/081076, filed Nov. 12, 2019 which was published under PCT Article 21(2) and which claims priority to European Application No. 18205826.3, filed Nov. 13, 2018, which are all hereby incorporated in their entirety by reference.

TECHNICAL FIELD

The disclosure relates to thermally expandable microspheres made from cellulose-based biopolymers, and also to a process for their production.

BACKGROUND

Thermally expandable microspheres are known in the art, and are described for example in U.S. Pat. No. 3,615,972, WO 00/37547 and WO2007/091960. A number of examples are sold under the trade name Expancel®. They can be expanded to form extremely low weight and low density fillers, and find use in applications such as foamed or low density resins, paints and coatings, cements, inks and crack fillers. Consumer products that often contain expandable microspheres include lightweight shoe soles (for example for running shoes), textured coverings such as wallpaper, solar reflective and insulating coatings, food packaging sealants, wine corks, artificial leather, foams for protective helmet liners, and automotive weather strips.

Thermally expandable polymer microspheres usually comprise a thermoplastic polymeric shell, with a hollow core comprising a blowing agent which expands on heating. Examples of blowing agents include low boiling hydrocarbons or halogenated hydrocarbons, which are liquid at room temperature, but which vapourise on heating. To produce expanded microspheres, the expandable microspheres are heated, such that the thermoplastic polymeric shell softens, and the blowing agent vapourises and expands, thus expanding the microsphere. Typically, the microsphere diameter can increase between about 1.5 and 8 times during expansion.

A problem associated with the thermoplastic polymers typically used in the microspheres is that they are not derived from sustainable sources. Typical monomers include those based on acrylates, acrylonitriles, acrylamides, vinylidene dichloride and styrenes, which are mainly derived from petrochemical sources. In addition, many polymers are non-biodegradeable, or at least biodegrade so slowly that they risk cumulative build-up in the environment.

BRIEF SUMMARY

The present disclosure is a thermally expandable microsphere comprising a polymeric shell surrounding a hollow core, in which the hollow core comprises the blowing agent, and the polymeric shell comprises a carboxylate-functionalised cellulose having a glass transition temperature (Tg) of at least about 125° C.

The disclosure is also directed to a process for preparing such expandable microspheres, comprising mixing an aqueous phase that optionally comprises an emulsifier with an organic phase that comprises an organic solvent, a blowing agent and a carboxylate-functionalised cellulose having a Tg of at least about 125° C., to form a dispersion of microspheres.

BRIEF DESCRIPTION OF THE DRAWINGS

The present disclosure will hereinafter be described in conjunction with the following drawing figures, wherein like numerals denote like elements, and:

FIG. 1 illustrates the difference between a single core (FIG. 1A) and multi-core (FIG. 1B) microsphere.

FIG. 2 shows photomicrographs of the microspheres of Example 40, before (FIG. 2A) and after (FIG. 2B) thermal expansion. FIG. 2A was taken at 149.5° C., and FIG. 2B at 203.4° C., with a temperature ramp of 20° C./minute.

FIG. 3 shows photomicrographs of the microspheres of Example 12, before (FIG. 3A) and after (FIG. 3B) thermal expansion. FIG. 3A was taken at 130.0° C., and FIG. 3B at 172.4° C., with a temperature ramp of 20° C./minute.

FIG. 4 shows photomicrographs of the microspheres of Example 4, before (FIG. 4A) and after (FIG. 4B) thermal expansion. FIG. 4A was taken at 170.5° C., and FIG. 4B at 217.9° C., with a temperature ramp of 20° C./minute.

FIG. 5 shows photomicrographs of the microspheres of Example 47, before (FIG. 5A) and after (FIG. 5B) heat treatment. FIG. 5A was taken at 102.7° C., and FIG. 5B at 144.6° C., with a temperature ramp of 20° C./minute.

FIG. 6 shows photomicrographs of the microspheres of Example 32, before (FIG. 6A) and after (FIG. 6B) heat treatment. FIG. 6A was taken at 107.0° C., and FIG. 6B at 151.5° C., with a temperature ramp of 20° C./minute.

In all the photographs in FIGS. 2 to 6, the scale bars are 400 μm.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description.

The present disclosure is, therefore, directed at finding thermally expandable polymeric microspheres using bio-derived polymers.

The expandable microspheres are based on a polymeric shell comprising a carboxylate-functionalised cellulose. The functional group is a carboxylate group, or more than one carboxylate group, which are typically selected from C1 to C12 carboxylates. The carboxylate moiety forms part of the link between the carboxylate functional group and the cellulose, i.e. the cellulose is linked to the carboxylate functional group via an ester link.

The polymeric shell can comprise or includes one or more polymeric components, in which at least one component, more than one component or all polymeric components are selected from such carboxylate-functionalised celluloses. Where there the shell comprises polymers other than those described herein (i.e. are not carboxylate-functionalised cellulose having a glass transition temperature (Tg) of at least about 125° C.), their content is typically less than about 50 wt %, for example less than about 30 wt %, or less than about 10 wt %, such as about 9 wt % or below. These percentages are based on the total polymer content of the shell.

In embodiments, the carboxylate functional group on the carboxylate-functionalised cellulose can be represented by formula (1).

Formula (1)

In Formula (1), A is selected from —H, —OH, —ORb, —C(O)OH and —C(O)ORb. In embodiments, A is selected from —H and —C(O)OH.

Ra can be absent, i.e. A can be directly attached to the C=O group. However, where present, Ra can be selected from saturated or unsaturated aliphatic groups having from about 1 to about 11 carbon atoms, and which can be linear, branched or cyclic.

Ra can also be selected from 5- and 6-membered aromatic rings.

Ra can optionally comprise one or more substituents selected from —OH, halide, C1-4 alkyl, and C1-4 alkoxy, where the C1-4 alkyl and C1-4 alkoxy groups are optionally substituted with one or more groups selected from halide and —OH.

Ra in embodiments comprises from about 1 to about 7 carbon atoms, for example from about 1 to about 5, or from about 1 to about 3 carbon atoms.

Rb on each occurrence is independently selected from a C1-4 alkyl group, for example a C1-2 alkyl group, optionally with one or more substituents selected from halide and —OH groups. In embodiments, the C1-4 alkyl group or C1-2 alkyl groups are unsubstituted.

In embodiments, Ra can be a saturated linear or branched aliphatic $C_vR_{2v}^c$ group or a cyclic $C_wR_{2w-2}^c$ aliphatic group. v is an integer in the range of from about 1 to about 11, for example in the range of from about 1 to about 8, such as from about 1 to about 6 or from about 1 to about 4. w is an integer in the range of from about 3 to about 11, for example from about 4 to about 6

Rc on each occurrence is independently selected from H, —OH, halide, C1-4 alkyl, and C1-4 alkoxy, where the C1-4 alkyl and C1-4 alkoxy groups are optionally substituted with one or more groups selected from halide and —OH.

In other embodiments, Ra can be an unsaturated linear or branched aliphatic $C_xR_{2x-2y}^c$ group comprising "y" double bonds. x is an integer in the range of from about 2 to about 11, for example from about 2 to about 6 or from about 2 to about 4. y represents the number of double bonds, and is typically about 1 or about 2.

In further embodiments, Ra can be an unsaturated cyclic aliphatic $C_wR_{2w-2y-2}^c$ group comprising "y" double bonds, where y is typically about 1 or about 2.

In still further embodiments, Ra can be a $C_zR_{z-2}^c$ aromatic group. z is an integer selected from about 5 and about 6.

In still further embodiments, Ra can be a linear or branched aliphatic group comprising a cyclic aliphatic or aromatic ring. Thus, Ra can be a $C_pR_{2p-2q}^c$–E–$C_rR_{2r-2s}^c$ group having no more than about 11 carbon atoms, where E is $C_wR_{2w-2}$, $C_wR_{2w-2y-2}^c$, or $C_zR_{z-2}^c$ as defined above. p and r are each independently a whole number from about 0 to about 8, where p+r is at least about 1. q and s are each the number of double bonds in the respective non-cyclic aliphatic component. In embodiments, each of q and s are independently selected from about 0, about 1 and about 2.

Halides are typically selected from F and Cl In embodiments, however, the functional group is halide-free, such that there are no halides in groups A, Ra, Rb and Rc.

In embodiments, at least one Rc group is H. In other embodiments no more than two Rc groups are other than H, and in further embodiments, no more than one Rc group is other than H. In still further embodiments, all Rc groups are H.

In the above definitions of Ra, Rb and Rc, where there is more than one —OH substituent, there is typically no more than one —OH substituent per carbon atom.

In certain embodiments, Ra is an optionally substituted C1-C8 aliphatic (alkylene) group. In other embodiments, Ra is an optionally substituted C6 aromatic ring. In further embodiments, Ra is unsubstituted.

In embodiments, the functional group on the cellulose substituent is selected from acetate, propionate, butyrate, pentanoate, hexanoate, heptanoate, octanoate and phthalate. In further embodiments, it is selected from acetate, propionate and butyrate.

The degree of substitution (DS) of the hydroxyl groups of the cellulose by the one or more carboxylate groups can be in the range of from about 0.9 to about 3.5, and in embodiments is in the range of from about 1.5 to about 3.5, for example in the range of from about 2.5 to about 3.3.

Optionally, other functional groups may be present in the functionalised cellulose. For example, —OH groups on the cellulose molecule that are not already substituted with carboxylate-functionality can be replaced by an alkoxy group, or more than one alkoxy group, e.g. selected from C1 to C6 alkoxy groups. In other embodiments, although less preferred, the —OH group can be replaced with a halide group, for example F or Cl. Where such other functional groups are present, they are in lower molar quantities than the one or more carboxylate groups. In embodiments, the degree of substitution of the cellulose by other functional groups is no more than 1, for example no more than about 0.5 or no more than about 0.2. In further embodiments, the degree of substitution by groups other than carboxylate groups is no more than about 0.1.

In embodiments, the carboxylate-functionalised cellulose is cellulose acetate. In embodiments, the cellulose can be further functionalised with two or more different carboxylate groups. In embodiments, in these additional carboxylate groups, Ra is an aliphatic and unsubstituted C2 or C3 group, and A is H (i.e. the carboxylate group is selected from propionate and butyrate).

The glass transition temperature (Tg) of the functionalised cellulose that forms the shell of the microspheres is at least about 125° C. The Tg can be measured using differential scanning calorimetry (DSC), for example using the method described by Nishio et al; Cellulose, 2006 (13), 245-259, in which an about 5 mg sample is heated for a first time at a rate of about 20° C./min under a nitrogen atmosphere from ambient temperature (about 25° C.) to about 240° C., and then immediately quenched to about −50° C., before being heated for a second time from about −50° C. to about 240° C. at about 20° C./min under a nitrogen atmosphere, the Tg calculation being based on the second heating cycle. Using functionalised cellulose materials with lower Tg results in less consistent expansion characteristics.

In embodiments, the Tg of the carboxylate-functionalised cellulose is at least about 130° C., for example at least about 135° C., or at least about 141° C. In embodiments, the Tg of the carboxylate-functionalised cellulose is no more than about 215° C., for example no more than about 200° C., or no more than about 190° C. In embodiments, the Tg is in the range of from about 125 to about 215° C., for example in the range of from about 125 to about 200° C., or from about 125 to about 190° C. In further embodiments, the Tg is in the range of from about 130 to about 215° C., for example from about 130 to about 200° C. or from about 130 to about 190° C. In other embodiments, the Tg is in the range of from about 135 to about 215° C., for example from about 135 to about 200° C. or from about 135 to about 190° C. In still further embodiments, the Tg is in the range of from about 141 to about 215° C., for example from about 141 to about 200° C. or from about 141 to about 190° C.

The melting point of the functionalised cellulose is typically above the Tg value, and in embodiments is above about 130° C. In embodiments, the melting point is above about 150° C. The melting point is typically no more than about 270° C., for example no more than about 250° C.

The Tg and the melting point of the carboxylate-functionalised cellulose can be modified or controlled by varying the functional groups on the functionalised cellulose or by varying the molecular weight.

The thermally expandable microspheres are hollow, in which the shell comprises the carboxylate-functionalised cellulose, and the hollow centre or core comprises one or more blowing agents. The carboxylate-functionalised celluloses used to prepare the microspheres typically have a density of about 1.1-about 1.35 g/cm3. In the expanded microspheres, the density is typically less than about 1 g/cm3, and is suitably in the range of from about 0.005 to about 0.8 g/cm3, or from about 0.01 to about 0.6 g/cm3. In further embodiments, the density of the expanded microspheres is in the range of from about 0.01 to about 0.4 g/cm3. Higher densities, particularly densities of 1 g/cm3 or more, generally mean that the microsphere samples are not suitable for use.

In embodiments, the number average molecular weight (Mn) of the functionalised cellulose used to form the microspheres is in the range of from about 1 000 to about 700 000, for example in the range of from about 2 000 to about 500 000. In embodiments, it is in the range of from about 10 000 to about 100 000, for example from about 10 000 to about 80 000.

In embodiments, to further enhance the properties of the polymer shell, the polymeric shell can comprise substances that react with groups on the carboxylate-functionalised celluloses or that form an interpenetrating polymer network around the carboxylate-functionalised celluloses. In this way, it is possible to further improve the barrier properties of the polymer shell and possibly improve the mechanical properties of the polymer shell.

Examples of substances that can improve the properties of the microspheres by reacting with groups on the carboxylate-functionalised cellulose are crosslinkers, such as: 1,2,4,5-benzenetetracarboxylic acid dianhydride, also referred to as pyromellitic dianhydride, trimesoyl chloride and glyoxal.

Substances that form interpenetrating polymer network around carboxylate-functionalised celluloses by reactions with groups on the carboxylate-functionalised celluloses and/or reactions with themselves are for instance known as wet strength agents in the paper industry. Examples of such substances are poly (amino amide) epichlorohydrin, urea formaldehyde and melamine formaldehyde.

In further embodiments, the polymeric shell can comprise particles to improve the mechanical properties and gas barrier of the polymer shell. Examples of such particles are talc, montmorillonite, nanocrystalline cellulose and various types of clay, such as bentonite.

A number of factors can result in high densities. For example, high density can result from poor microsphere yield, i.e. the percentage of microspheres in the polymeric material is too low to reduce the overall density to an acceptable level. Another issue is poor expansion characteristics, which can arise where too many of the microspheres contain insufficient blowing agent to enable adequate expansion. This can result from the polymer shell being too permeable to the blowing agent, or due to the formation of so-called "multiple core" microspheres where, instead of a single blowing agent-containing core, there are multiple blowing agent-containing cores within the shell (e.g. like a microspherical foam or sponge). In such multi-core microspheres, the blowing agent concentration is typically too low to reduce the density adequately. Another cause is aggregation or agglomeration of the polymer, resulting in poor microsphere production and a denser material. Too high a proportion of aggregated material or poorly expanding microspheres can also lead to large inhomogeneity in the expansion characteristics of the resulting microsphere product. This is particularly unfavourable for surface-sensitive applications such as coatings, where a smooth finish is desirable.

Figure 1A:
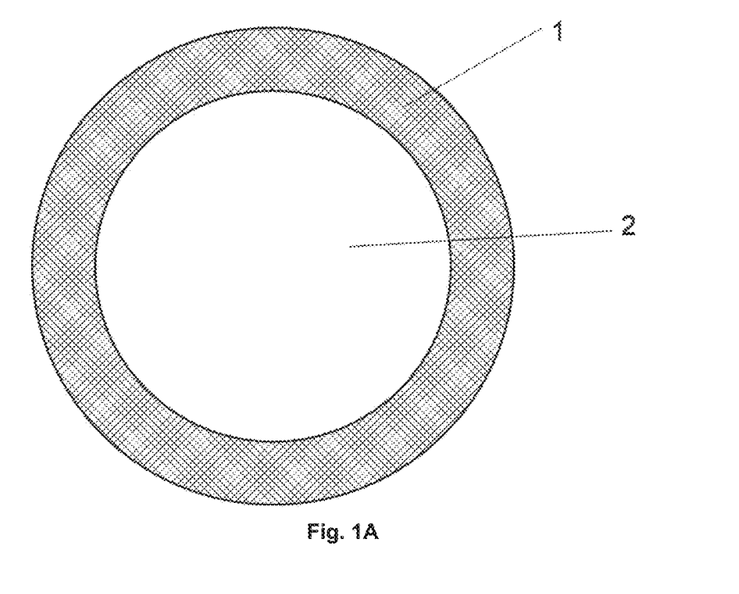
Figure 1B:
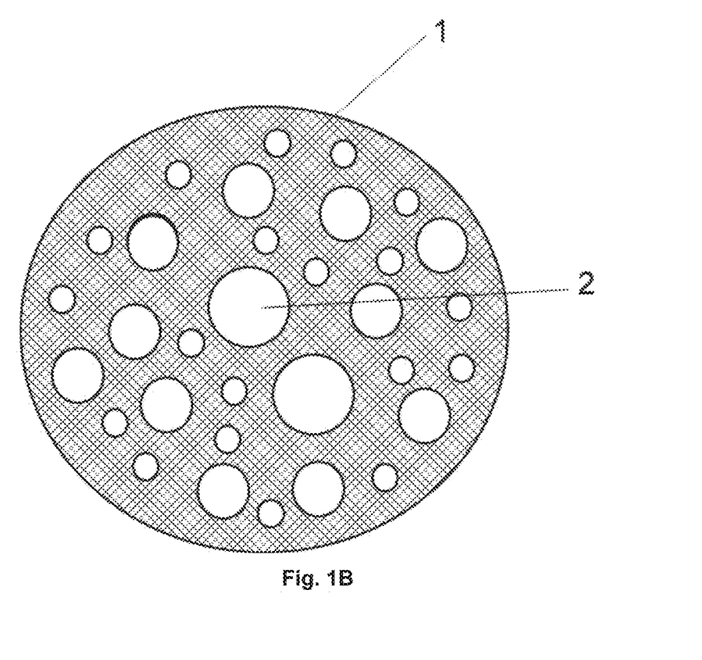

Illustrative cross sections of single core and multi-core microspheres are provided in FIGS. 1A and 1B respectively, where regions of polymer, 1, are represented by the cross-hatched areas, and blowing agent-containing regions, 2, are represented by blank areas.

The one or more blowing agents generally have a boiling point above about 25° C. at about 5.0 bara pressure or above about 25° C. at about 3.0 bara pressure, where "bara" stands for bar-absolute. In embodiments, they have a boiling point above about 25° C. at atmospheric pressure (about 1.013 bara). Typically, they have a boiling point of about 250° C. or less at atmospheric pressure, for example about 220° C. or less, or about 200° C. or less. They are preferably inert, and do not react with the functionalised cellulose shell. Boiling points at elevated pressures can be calculated using the Clausius Clapeyron equation.

Examples of blowing agents include dialkyl ethers, alkanes and halocarbons, e.g. chlorocarbons, fluorocarbons or chlorofluorocarbons. In embodiments, the dialkyl ether comprises two alkyl groups each selected from C2 to C5 alkyl groups. In embodiments, the alkane is a C4 to C12 alkane. In embodiments, the haloalkane is selected from C2 to C10 haloalkanes. The haloalkanes can comprise one or more halogen atoms selected from chlorine and fluorine. The alkyl or haloalkyl groups in the dialkyl ethers, alkanes and haloalkanes can be linear, branched or cyclic. One or a mixture of one or more blowing agents can be used.

In embodiments, for environmental reasons, the one or more blowing agents are selected from alkyl ethers and alkanes, and in further embodiments the one or more blowing agents are selected from alkanes. Haloalkanes are preferably avoided, due to their potential ozone depletion properties, and also due to their generally higher global warming potential.

Examples of suitable blowing agents that can be used include n-pentane, isopentane, neopentane, cyclopentane, cyclohexane, n-butane, isobutane, isohexane, neohexane, heptane, isoheptane, octane, isooctane, isodecane, and isododecane. In embodiments, the blowing agent is selected from C8 to C12 iso-alkanes.

In the expandable microspheres, the one or more blowing agents are typically present in an amount of from about 5 to about 50 wt %, based on the total weight of functionalised cellulose and blowing agent(s), for example in the range of from about 5 to about 45 wt %, or from about 10 to about 40 wt %.

Carboxylate-functionalised cellulose materials can be purchased commercially, or can be made by known techniques, for example through mixing cellulose with a suitable carboxylic acid in the presence of a strong acid such as sulfuric acid, or by base-catalysed reaction of cellulose with acyl chloride, for example as described in Nishio et al; Cellulose, 2006 (13), 245-259.

They can be formed into microspheres by being dissolved in a suitable organic solvent or mixture of solvents, adding the one or more blowing agents, and mixing with an aqueous phase that optionally comprises one or more emulsifiers. After a period of time (e.g. for about 1 minute to about 20 hours, such as in the range of from about 5 minutes to about 10 hours), optionally under active mixing, e.g. by stirring, the unexpanded microspheres form, and can be separated as a solid, for example using conventional techniques such as decantation or filtration.

Mixing can be carried out at ambient temperature, although temperatures in the range of from about 5 to about 75° C. can be used.

In embodiments, the aqueous phase can be pre-saturated with one or more organic solvents in which the carboxylate-functionalised cellulose is soluble, before being mixed with the carboxylate-functionalised cellulose-containing organic phase. In further embodiments, the mixture can be left or stirred for a period of time, for example from about 1 to about 100 hours, or from about 2 to about 50 hours, to allow evaporation of at least part of the solvent/water mixture. This can be at temperatures in the range of from about 10 to about 95° C., for example at a temperature of from about 20 to about 90° C.

The emulsifier helps to stabilise droplets of the carboxylate-functionalised cellulose-containing organic phase in the aqueous phase, and in embodiments assists in the formation of an emulsion of the organic phase in the aqueous phase (i.e. an oil-in-water type emulsion).

The stabilisation of the droplets or emulsion droplets is preferred for a number of reasons. Without stabilisation, coalescence of the droplets containing the carboxylate-modified cellulose and the blowing agents may occur. Coalescence can have negative effects; such as non-uniform droplet size, poor yields of microspheres, and can also increase aggregation of the microspheres.

The emulsifier is typically present in an amount of about 0 to about 20 wt %, for example from about 0.01 to about 20 wt. %, from about 0.05 to about 10 wt %, of from about 0.1 to about 5 wt % in the aqueous phase. In further embodiments, the emulsifier is present in an amount of from about 0.1 to about 1 wt % in the aqueous phase.

The choice of emulsifier is not particularly limited, and can be chosen from inorganic or organic emulsifiers.

Examples of inorganic materials that can act as an emulsifier include silica, in particular colloidal silica, that can either be used in an unmodified "bare" form, or optionally can be surface modified to tailor its hydrophobic/hydrophilic characteristics, for example using organosilane-modified silica or colloidal silica.

In embodiments, an "organo" group in the organosilane can be selected from C1-20 alkyl, C1-20 alkenyl, C5-6 aryl, and C5-6 heteroaryl with one or more (e.g. 1 to 3) heteroatoms selected from O, S and N. Each of these groups can optionally be substituted with one or more groups selected from halide, hydroxy, epoxy, thiol, amino, C1-20 alkylamino, di-C1-20 alkylamino, hydroxyamino, hydroxy-C1-20 alkylamino, (hydroxy-C1-20 alky)(C1-20 alkyl)amino, di(hydroxy-C1-20 alkyl)amino C1-20 alkoxy, C1-20 amido, C1-20 ureido, C1-20 mercapto, C3-20 epoxyalkoxy, C1-20 alkylacrylate, ethylene glycol or oligomers thereof with about 1 to about 20 ethylene glycol groups, and propylene glycol or oligomers thereof with about 1 to about 20 propylene glycol groups. Any aliphatic groups can be linear, branched or cyclic.

The organosilane modified silica or colloidal silica can be produced by reacting silica (or colloidal silica) with an organosilane compound, typically having the formula $R_nSiX_{4-n}$, where R is one of the above-identified organic groups, X is a halide, hydroxy or C1-6 alkoxy, and n is an integer in the range of from about 1 to about 3, typically about 1 or about 2.

Suitable silane compounds include tris-(trimethoxy)silane, octyl triethoxysilane, methyl triethoxysilane, methyl trimethoxysilane; gamma-mercaptopropyl trimethoxysilane, beta-(3,4-epoxycyclohexyl)-ethyl trimethoxysilane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltrimethoxy silane, phenyltrimethoxy silane, 3-mercaptopropyltriethoxy silane, cyclohexyltrimethoxy silane, cyclohexyltriethoxy silane, dimethyldi ethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, vinyltriethoxy silane, hexamethyldisilizane, and mixtures thereof. U.S. Pat. No. 4,927,749 discloses further suitable silanes which may be used.

Examples of silica that can be used include those sold under the Levasil™, Bindzil™ and Ludox™ trade names, which are associated with colloidal silica. Solid forms of silica include fumed silica and precipitated silica can also be used, which can be dispersed in water to form a fine suspension. Sources of fumed silica include those sold under the trade names Cab-o-Sil™ and Aerosil™.

Other inorganic emulsifiers include colloidal clays (e.g. chalk and bentonite), and salts, oxides and hydroxides of Al, Ca, Mg, Ba, Fe, Zn, Ti, Ni and Mn (e.g. calcium phosphate, calcium carbonate, magnesium hydroxide, barium sulphate, calcium oxalate, titanium dioxide, and hydroxides of aluminium, iron, zinc, nickel or manganese).

When solid, inorganic emulsifiers are used, they can produce so-called "Pickering" emulsions, where the solid inorganic particles are at the interface between the aqueous and organic phases.

Organic emulsifiers include anionic, cationic, amphoteric, zwitterionic and nonionic surfactants, which are generally known and available commercially.

Examples include sorbitan esters (such as those sold under the trade name Span™), e.g. sorbitan monolaurate (e.g. Span™ 20) and sorbitan monooleate (e.g. Span™80). Further examples include polyethoxylated sorbitan esters (e.g. those sold under the trade name Tween™), such as PEG-20 sorbitan monolaurate (Tween™ 20), PEG-20 sorbitan monooleate (Tween™ 80) and Polyoxyethylenesorbitan trioleate (Tween™ 85). Other examples include C6-C22 alkyl sulfates, such as sodium dodecyl sulfate; sulfates with anions of formula CnH2n+1(OCmH2m)p-OSO3- where n is from about 6 to about 22, m is from about 2 to about 3, and p is from about 2 to about 4, such as sodium lauryl ether sulfate and sodium C12-14 pareth-3 sulfate; C6-22 alkyl glycosides, such as lauryl glucoside; glucamides of formula CnH2n+1C(O)N(X)CH2(C4H4[OH]4)CH2OH, where n is from about 6 to about 22, and X is H or C1-4 alkyl, for example capryl methyl glucamide, lauryl methyl glucamide and dodecyl glucamide; amino acids substituted with C2-16 carboxylate groups and their salts, for example sodium or disodium cocoyl glutamate and sodium lauroyl sarcosinate; C6-22 fatty acids and their salts, such as sodium oleate and potassium oleate; polyethylene glycol-substituted phenols with about 5 to about 25 glycol units, for example polyethylene glycol p-(1,1,3,3-tetramethylbutyl)-phenyl ether (which is available as Triton™ X-100); C6-22 alkyl amine oxides, such as lauramine oxide and C6-22 alkyl alcohols, such as cetyl alcohol and stearyl alcohol. Further examples include polymeric emulsifiers, such as (meth)acrylate and (meth)acrylic acid polymers (e.g. polymethylmethacrylic acid) and polymers based on organoammonium salts having at least one C3-10 alkenyl group and at least one C1-4 alkyl group, for example polydiallyldimethylammonium chloride (polyDADMAC).

Consumer washing-up liquids can be used as the source of the emulsifier, for example those sold under the trade names Yes® and Fairy®, which comprise sodium dodecyl sulfate, sodium C12-14 pareth-3-sulfate and lauramine oxide.

Other examples of emulsifiers include polyvinyl alcohols, optionally partially or fully saponified. In embodiments, the polyvinyl alcohol has a degree of hydrolysis in the range of from about 70 to about 100 mol %, for example in the range of from about 80 to about 100 mol %, or from about 80 to about 98 mol %. The Hoppler viscosity in about 4% aqueous solution can be about 1 to about 70 mPas, or in other embodiments in the range of from about 3 to about 40 mPas (measured at about 20° C. according to DIN 53015).

One or more emulsifiers can be used. Mixtures of organic and inorganic emulsifiers can also be used.

The organic solvent can be selected from those having one or more functional group selected from esters, amides, aldehydes, ketones, alcohols (including glycols) and ethers, for example those having about 3 to about 12 carbon atoms. Esters, ketones and ethers may, in embodiments, be part of a cyclic structure. Further examples include haloalkanes having from about 1 to about 6 carbon atoms and halocarboxylic acids having from about 1 to about 6 carbon atoms, where the halogen is selected from fluorine, chlorine, bromine and iodine. In embodiments, any alcohols used are glycols.

Examples of organic solvents that can be used include ethyl acetate, ethyl formate, methyl acetate, n-propyl formate, iso-propyl formate, n-propyl acetate, iso-propyl acetate, iso-butyl acetate, n-butyl acetate, n-pentyl formate, iso-pentyl formate, n-pentyl acetate, iso-pentyl acetate, ethyl propionate, iso-butyl iso-butyrate, n-butyl propionate, ethyl 3-ethoxypropionate, 2-ethylhexyl acetate, acetone, methyl ethyl ketone, diethyl ketone, methyl isobutyl ketone, methyl isoamyl ketone, methyl n-amyl ketone, mesityl oxide, acetophenone, cyclohexanone, diethyl phthalate, ethyl lactate, benzyl acetate, butyrolactone, acetyl acetone, methyl cyclohexanone, benzaldehyde, diisobutyl ketone diacetone alcohol, ethylene glycol, glyceryl-α-monochlorohydrin, propylene glycol, glycol ethers (for example propylene glycol monomethyl ether, ethylene glycol mono-methyl ether, ethylene glycol mono-ethyl ether, ethylene glycol mono-n-butyl ether, propylene glycol mono-tert-butyl ether, propylene glycol monopropyl ether, propylene glycol monobutyl ether), glycol ether esters (for example ethylene glycol mono-methyl ether acetate, ethylene glycol mono-ethyl ether acetate, ethylene glycol mono-butyl ether acetate, ethylene glycol diacetate), n-propyl alcohol, iso-propyl alcohol, n-butanol, sec-butanol, isobutanol, benzyl alcohol, diisopropyl ether, dimethoxymethane, dimethoxyethane, 1,4-dioxane, 1,3-dioxolane, tetrahydrofuran, anisole, phenetole and dimethyl formamide Other examples of solvents include dimethyl sulfoxide, toluene, xylene, n-methyl-2-pyrrolidone, methyl chloride, chloroform, carbon tetrachloride, trichloroacetic acid, methyl bromide, methyl iodide, trichloroethylene, and tetrachloroethylene. The organic solvent can be a mixture of two or more solvents. The organic solvent can comprise water, although typically the water content of the organic solvent(s) before mixing with the aqueous phase is less than about 5 wt %, i.e. about 0 to about 5 wt % water, for example about 0 to about 1 wt % water.

In embodiments, the solvent is selected from one or more of ethyl acetate, methyl acetate, ethyl formate and acetone.

Typically, the carboxylate-functionalised cellulose content of the organic phase is in the range of from about 0.1 to about 50 wt %. In embodiments, it can be in the range of from about 0.5 to about 25 wt %, for example in the range of from about 1 to about 15 wt %.

The amount of blowing agent(s) in the organic phase is typically in the range of from about 0.5 to about 20 wt %, for example in the range of from about 1 to about 15 wt %. In embodiments, the weight of blowing agent in the organic phase is equal to or less than the weight of carboxylate-functionalised cellulose, for example the weight ratio of blowing agent to carboxylate-functionalised cellulose can be about 1.0 or less, for example about 0.8 or less. In embodiments the minimum weight ratio is about 0.1, or in further embodiments about 0.2. In embodiments, the weight ratio of blowing agent to carboxylate-functionalised cellulose in the organic phase is in the range of from about 0.1 to about 1.0, such as in the range of from about 0.2 to about 0.8.

The weight ratio of organic phase to aqueous phase can be in the range of from about 0.1 to about 45 wt %, for example in the range of from about 1 to about 30 wt % or from about 3 to about 25 wt %, or from about 4 to about 15 wt %.

If substances that react with groups on the carboxylate-functionalised celluloses and/or particles are added to further improve the polymeric shell properties, typically, these substance and/or particles are added to the organic phase (i.e. the phase containing carboxylate-functionalised cellulose, solvent and blowing agent).

The unexpanded microspheres typically have volume mean particle sizes (diameters), i.e. D(0.5) values, in the range of from about 1 to about 1000 μm, such as about 5 to about 500 μm or, in embodiments, from about 10 to about 400 μm.

The expanded microspheres are typically in the range of from about 1.5 to about 8 times larger in diameter than unexpanded microspheres, for example about 2 to about 7 times or about 3 to about 6 times their original diameter.

The particle sizes are suitably measured using light scattering techniques, e.g. laser diffraction, such as low angle laser light scattering (LALLS). They can also be measured by image analysis from a photograph or electronic micrograph image of the pre- or post-expanded microspheres.

To expand the expandable microspheres, they can be heated to a temperature above the higher of the boiling point of the blowing agent and the Tg of the functionalised cellulose, and also a temperature below the melting point of the microspheres. To halt the expansion, the microspheres can be cooled back down to below the Tg of the functionalised cellulose and/or the boiling point of the blowing agent.

Ways of heating the expandable microspheres include direct or indirect contact with a heat transfer medium such as steam or pressurised steam, as described for example in WO2004/056549, WO2014/198532 and WO2016/091847. In further embodiments, direct or indirect contact with other heated gases (e.g. air or nitrogen) optionally mixed with steam can be used. In still further embodiments, where indirect heating is used, a liquid heat transfer medium can be used, e.g. heated oil. In another embodiment, IR radiation can be used to heat the microspheres.

Expansion properties of the thermally expandable thermoplastic microspheres can be evaluated using a thermomechanical analyser (e.g. a Mettler TMA 841) and quantitative data can be obtained from images using suitable software, for example STARe software. Tstart is the temperature at which the expansion starts and Tmax is the temperature at which maximum expansion is obtained.

The expandable or expanded thermoplastic microspheres may be provided in a wet form (e.g. as an aqueous slurry or a wet cake) or as a dry powder. They can be provided in unexpanded form, e.g. for expansion local to their point of use, or they can be pre-expanded before dispatch to the point of end use.

The microspheres can find use in many applications, for example in the manufacture of paper (e.g. embossed paper, a paper filler, a sizing agent), inks, corks, cement based compositions, adhesives, foams, insulation materials, coatings, rubber-based products, thermoplastics, thermosets, ceramics, non-woven composite materials, fillers etc. to provide for example a lightweight filler in such applications.

The thermally expandable microspheres described herein can be thermally expanded when dry, when wet or when in a slurry. They are also able to withhold the blowing agent for extended periods of time (whether wet, dry or slurried), e.g. at least about 1 week, such as at least one month or at least about 4 months. In addition, their expansion is typically irreversible, i.e. cooling the microspheres after thermal expansion does not result in their contraction back to their pre-expanded size.

EXAMPLES

The following examples are intended to illustrate the disclosure. Two synthetic routes were used to prepare the microspheres, as detailed below. They are generally referred to as a "solvent extraction" method and a "solvent evaporation" method.

The expansion characteristics were evaluated using a Mettler TMA 841 thermomechanical analyser, interfaced with a PC running STARe software. The heating rate was 20° C./min, using a load (net.) of 0.06 N.

Visual analysis of pre- and post-expanded microspheres used a Leica™ DM1000 LED microscope, with image analysis provided by a PC running Leica™ Application Suite, version 4.8.0 software. Photographs in FIGS. 2 to 6 were collected using the same type of microscope, fitted with a Linkam™ LTS420 heating stage.

Differential Scanning calorimetery (DSC) measurements were obtained using a Mettler Toledo DSC 822e device.

Synthesis Method 1—Solvent Extraction

A solution of carboxylate-functionalised cellulose polymer in a suitable organic solvent was prepared by dissolving the polymer overnight with the use of a magnetic stirrer.

Blowing agent was added to the solution, and the mixture was stirred for two minutes to re-dissolve any precipitated polymer.

This solution was added over a period of 20 to 30 seconds to a mixture of a surfactant in distilled water, under constant stirring using a turbine stirrer operating at 1500 rpm (Examples 1, 7-12, 16-17, 19, 21-28, 30-32), 2000 rpm (Examples 33-38, 40-41), 900 rpm (Examples 44-46) or 1000 rpm (Example 47). After complete addition of the organic solution, the mixture was stirred for an additional 10 minutes at the same stirring speed.

The mixture was then filtered through 00R grade filter paper. The filtered solids were washed twice with water, and dried overnight at room temperature in a fume hood, before analysis.

Synthesis Method 2—Solvent Evaporation

A solution of carboxylate-functionalised cellulose polymer in ethyl acetate or ethyl formate was prepared by dissolving the polymer overnight with the use of a magnetic stirrer.

A blowing agent was added, and the mixture was stirred for two minutes to re-dissolve any precipitated polymer.

This organic solution was added over a period of about 10 seconds to a mixture of a surfactant in distilled water saturated with ethyl acetate or ethyl formate, while constantly stirring the water phase with a turbine stirrer at 1500 rpm (Examples 2-6, 13-15, 18, 20, 29), 2000 rpm (Example 39) or 6000 rpm (Examples 42-43). After complete addition of the organic solution, the mixture was stirred for a further two minutes at the same stirring speed. The resulting mixture was poured into 300 ml distilled water over a period of about 10 seconds, while stirring rapidly with a magnetic stirrer. The stirring speed was lowered, and the mixture stirred for 14-18 hours in the back of a fume hood. After approximately 4-5 hours, some more distilled water was added to compensate for evaporation.

The mixture was then filtered through 00R grade filter paper, and the remaining solids were washed twice with water. After drying overnight at room temperature in a fume hood, the solids were collected and analysed.

Table 1 lists the carboxylate-functionalised cellulose polymers that were used to prepare microspheres. They were either cellulose acetate (CA), cellulose acetate propionate (CAP) or cellulose acetate butyrate (CAB).

TABLE 1

| | | Carboxylate-functionalised cellulose Details | | | | | | | |
|---|---|---|---|---|---|---|---|---|---|
| Polymer Reference | Source | Hydroxyl Content/ wt % | Acetate Content/ wt % | Propionate Content/ wt % | Butyrate Content/ wt % | Total DS (1) | Molecular Weight (2) | Tg/ ° C. (3) | Tm/ ° C. (4) |
| CA1 | Eastman | — (0.55) | 39.8 (2.45) | — | — | 3.00 | 30 000 | 180 | 230-250 |
| CA2 | Aldrich | — (0.55) | 39.8 (2.45) | — | — | 3.00 | 30 000 | 192 | n/a |
| CAP1 | Aldrich | 5 (0.83) | 0-1 (0.03) | 40-45 (2.09) | — | 2.95 | 15 000 | 153 | 188-210 |
| CAP2 | Eastman | 2.6 (0.47) | 2.5 (0.19) | 45 (2.51) | — | 3.04 | 25 000 | 142 | 188-210 |

TABLE 1-continued

Carboxylate-functionalised cellulose Details

| Polymer Reference | Source | Hydroxyl Content/ wt % | Acetate Content/ wt % | Propionate Content/ wt % | Butyrate Content/ wt % | Total DS (1) | Molecular Weight (2) | Tg/ °C. (3) | Tm/ °C. (4) |
|---|---|---|---|---|---|---|---|---|---|
| CAB1 | Eastman | 1.5 (0.26) | 29 (1.99) | — | 17 (0.71) | 2.96 | 65 000 | 161 | 230-240 |
| CAB2 | Eastman | 1.8 (0.34) | 13.5 (1.01) | — | 37 (1.68) | 3.03 | 70 000 | 141 | 195-205 |
| CAB3 | Eastman | 1.5 (0.28) | 13 (0.96) | — | 37 (1.66) | 2.90 | 20 000 | 123 | 155-165 |
| CAB4 | Eastman | 1 (0.21) | 4 (0.33) | — | 51 (2.54) | 3.08 | 57 000 | 96 | 165-175 |
| CAB5 | Eastman | 1.5 (0.31) | 2 (0.17) | — | 53 (2.64) | 3.12 | 16 000 | 85 | 127-142 |
| EC1I (5) | Aldrich | — (0.54) | — | — | — | 3.00* | — | 125 | n/a |

(1) DS = Degree of substitution. Total DS = sum of DS of individual substituents
(2) Number Average Molecular Weight, as provided by supplier
(3) Glass transition temperature as provided by supplier (Eastman), and other values were measured using the DSC method of Nishio et al, described above
(4) Melting Point, as provided by supplier
(5) Ethyl cellulose from Aldrich (with 22 cP viscosity in 5% 80:20 toluene/ethanol),
*DS of ethyl groups = 2.46.

Table 2 lists the surfactants used. In some cases, before use, they were diluted with water in the ratios specified.

TABLE 2

Surfactant details

| Surfactant Reference | Commercial Name | Dilution (1) | Description |
|---|---|---|---|
| A | PVA (2) | 02/98 | Polyvinyl alcohol |
| B | Tween ™ 20 | 10/90 | Non-ionic, Polyethylene glycol sorbitan monolaurate |
| C | PMAA (3) | undiluted | Used in powder form. |
| D | Modified colloidal silica (4) | undiluted | An aqueous colloidal silica with a silica content of 50 wt % |
| E | Yes ™ Detergent | 10/90 | Commercial, domestic detergent |

(1) wt surfactant/wt water
(2) Polyvinyl alcohol powder
(3) PMAA = Polymethacrylic acid powder from Polysciences Inc. After adding to the aqueous phase, the pH was modified to pH 7 using a few drops of 1M sodium hydroxide
(4) The sample was based on a Levasil ™ 50-28 colloidal silica modified by 3-glycidoxy-propyl-triethoxysilane and n-propyl-triethoxysilane, in which modification was achieved using the method described on pages 7-8 of WO2004/035474. The Levasil ™ 50-28 silica has a silica content of 50 wt % and a surface area of 70-100 m2g−1 (according to Sears titration).

Details of the samples that were prepared are shown in Table 3, and data on the resulting microspheres are shown in Table 4. With regards to the non-comparative values, optical observations using scanning electron microscopy confirmed the presence of microspheres.

TABLE 3

Synthesis Details

| Example | Method Used | Polymer (wt) | Solvent (wt) (1) | Blowing Agent (wt) (2) | Wt. Water | Surfactant (wt) |
|---|---|---|---|---|---|---|
| 1 | 1 | CA1 (0.8 g) | EtOAc (7.5 g) + MeOAc (7.4 g) | IO (0.4 g) | 120.0 g | A (30.0 g) |
| 2 | 2 | CA1 (1.0 g) | EtOAc (14.0 g) | IO (0.2 g) | 103.8 g | B (2.25 g) |
| 3 | 2 | CA2 (1.0 g) | EtOAc (14.0 g) | IO (0.2 g) | 103.8 g | B (2.25 g) |
| 4 | 2 | CA1 (1.0 g) | EtOFm (14.0 g) | IO (0.2 g) | 103.8 g | B (2.25 g) |
| 5 | 2 | CAP2 (2.7 g) | EtOAc (13.5 g) | IO (1.42 g) | 142.5 g | A (7.50 g) |
| 6 | 2 | CAP2 (2.7 g) | EtOAc (13.5 g) | IO (1.00 g) | 147.8 g | B (2.25 g) |
| 7 | 1 | CAP2 (1.1 g) | EtOAc (5.0 g) + MeOAc (5.0 g) | IO (0.56 g) | 149.8 g | C (0.23 g) |
| 8 | 1 | CAP2 (1.1 g) | EtOAc (5.0g) + MeOAc (5.0 g) | IO (0.56 g) | 148.4 g | D (1.60 g) |
| 9 | 1 | CAP2 (1.1 g) | EtOAc (10.0 g) | IO (0.57 g) | 108.0 g | A (42.0 g) |
| 10 | 1 | CAP2 (1.1 g) | EtOAc (9.0 g) + Actn (1.0 g) | IO (0.57 g) | 108.0 g | A (42.0 g) |
| 11 | 1 | CAP2 (1.1 g) | EtOAc (7.5 g) + MeOAc (2.5 g) | IO (0.57 g) | 108.0 g | A (42.0 g) |
| 12 | 1 | CAP2 (1.1 g) | EtOAc (5.0 g) + MeOAc (5.0 g) | IO (0.57 g) | 108.0 g | A (42.0 g) |
| 13 | 2 | CAP2 (1.9 g) | EtOAc (13.5 g) | IO (0.98 g) | 147.8 g | B (2.25 g) |
| 14 | 2 | CAP2 (2.3 g) | EtOAc (13.5 g) | IO (1.20 g) | 147.8 g | B (2.25 g) |
| 15 | 2 | CAP2 (2.7 g) | EtOAc (13.5 g) | IO (1.42 g) | 147.8 g | B (2.25 g) |
| 16 | 1 | CAP1 (1.7 g) | EtOAc (6.0 g) + MeOAc (5.9 g) | IO (0.87 g) | 95.0 g | A (55.0 g) |
| 17 | 1 | CAP1 (1.7 g) | EtOAc (6.0 g) + MeOAc (5.9 g) | IO (0.87 g) | 105.0 g | A (45.0 g) |

TABLE 3-continued

Synthesis Details

| Example | Method Used | Polymer (wt) | Solvent (wt) (1) | Blowing Agent (wt) (2) | Wt. Water | Surfactant (wt) |
|---|---|---|---|---|---|---|
| 18 | 2 | CAB1 (1.1 g) | EtOAc (13.5 g) | IO (0.56 g) | 142.5 g | A (7.50 g) |
| 19 | 1 | CAB1 (0.8 g) | EtOAc (5.0 g) + MeOAc (5.0 g) | IO (0.41 g) | 147.8 g | B (2.25 g) |
| 20 | 2 | CAB1 (1.3 g) | EtOAc (13.5 g) | IO (0.66 g) | 147.8 g | B (2.25 g) |
| 21 | 1 | CAB1 (0.8 g) | EtOAc (12.2 g) + Actn (1.3 g) | IO (0.80 g) | 148.4 g | D (1.60 g) |
| 22 | 1 | CAB1 (0.8 g) | EtOAc (12.2 g) + Actn (1.3 g) | IO (0.41 g) | 120.0 g | A (30.0 g) |
| 23 | 1 | CAB1 (0.8 g) | EtOAc (10.8 g) + Actn (2.7 g) | IO (0.41 g) | 120.0 g | A (30.0 g) |
| 24 | 1 | CAB1 (0.8 g) | EtOAc (10.1 g) + MeOAc (3.4 g) | IO (0.41 g) | 120.0 g | A (30.0 g) |
| 25 | 1 | CAB1 (0.8 g) | EtOAc (6.8 g) + MeOAc (6.7 g) | IO (0.41 g) | 120.0 g | A (30.0 g) |
| 26 | 1 | CAB2 (0.8 g) | EtOAc (6.8 g) + MeOAc (6.7 g) | IO (0.41 g) | 147.6 g | B (2.40 g) |
| 27 | 1 | CAB1 (0.8 g) | EtOAc (12.2 g) + Actn (1.3 g) | IO (0.41 g) | 147.8 g | B (2.25 g) |
| 28 | 1 | CAB1 (1.1 g) | EtOAc (12.2 g) + Actn (1.3 g) | IO (0.56 g) | 141.0 g | B (9.00 g) |
| 29* | 2 | CAB3 (2.7 g) | EtOAc (13.5 g) | IO (1.35 g) | 148.4 g | D (1.60 g) |
| 30* | 1 | CAB4 (1.1 g) | EtOAc (8.9 g) + MeOAc (3.0 g) | IO (0.57 g) | 108.0 g | A (42.0 g) |
| 31* | 1 | EC1 (1.2 g) | EtOAc (7.5 g) + MeOAc (7.5 g) | IO (0.62 g) | 105.0 g | A (45.0 g) |
| 32* | 1 | EC1 (1.2 g) | EtOAc (12.0 g) + Acetn (3.0 g) | IO (0.62 g) | 105.0 g | A (45.0 g) |
| 33 | 1 | CAP2 (1.5 g) | EtOAc (5.0 g) + MeOAc (5.0 g) | IO (0.64 g) | 142.5 g | A (7.50 g) |
| 34 | 1 | CAP2 (1.5 g) | EtOAc (5.0 g) + MeOAc (5.0 g) | IO (0.76 g) | 141.0 g | B (9.00 g) |
| 35 | 1 | CAP2 (1.1 g) | EtOAc (5.0 g) + MeOAc (5.0 g) | IO (0.56 g) | 141.0 g | B (9.00 g) |
| 36 | 1 | CAP2 (1.1 g) | EtOAc (5.0 g) + MeOAc (5.0 g) | IO (0.56 g) | 147.0 g | E (3.00 g) |
| 37 | 1 | CAB1 (1.1 g) | EtOAc (12.2 g) + Actn (1.3 g) | IO (0.56 g) | 110.0 g | A (40.0 g) |
| 38 | 1 | CAB1 (1.1 g) | EtOAc (12.2 g) + Actn (1.3 g) | IO (0.56 g) | 148.5 g | E (1.50 g) |
| 39 | 2 | CAB1 (1.1 g) | EtOAc (13.5 g) | IO (0.56 g) | 145.5 g | E (4.50 g) |
| 40 | 1 | CAB1 (1.1 g) | EtOAc (12.2 g) + Actn (1.3 g) | IO (0.56 g) | 80.0 g | A (70.0 g) |
| 41* | 1 | CAB5 (1.1 g) | EtOAc (12.2 g) + Actn (1.3 g) | IO (0.56 g) | 141.0 g | B (9.00 g) |
| 42 | 2 | CA2 (2.0 g) | EtOFm (28.0 g) | IDD (0.1 g) + IO (0.2 g) | 212.0 g | D (0.8 g) |
| 43 | 2 | CAB1 (1.1 g) | EtOAc (12.2 g) + Actn (1.3 g) | IO (0.56 g) | 148.5 g | E (1.50 g) |
| 44 | 1 | CAB1 (1.1 g) | EtOAc (12.2 g) + Actn (1.3 g) | IO (0.56 g) | 148.5 g | E (1.50 g) |
| 45 | 1 | CAB1 (1.1 g) | EtOAc (12.2 g) + Actn (1.3 g) | IO (0.56 g) | 147.0 g | E (3.00 g) |
| 46 | 1 | CAB1 (1.1 g) | EtOAc (12.2 g) + Actn (1.3 g) | IO (0.56 g) | 145.5 g | E (4.50 g) |
| 47* | 1 | CAB4 (1.1 g) | EtOAc (13.5 g) | IO (0.56 g) | 147.8 g | B (2.25 g) |

(1) EtOAc = Ethyl Acetate; MeOAc = Methyl acetate; EtOFm = Ethyl formate; Actn = Acetone
(2) IO = iso-octane; IDD = isododecane
*Comparative Example

TABLE 4

Microsphere Properties

| Example | Expanded Density/g dm−3 | Volatile Content/ wt % (1) | Tstart/ ° C. (2) | Tmax/ ° C. (3) |
|---|---|---|---|---|
| 1 | 61.5 | 17.7 ‡ | 181 | 221.2 |
| 2 | 71.9 | 9.3 | 185.5 | 194.3 |
| 3 | 70.9 | 9.4 | 187.5 | 216.0 |
| 4 | 29.8 | 8.2 | 188.7 | 224.9 |
| 5 | 35.2 | 14.4 | 140.1 | 146.4 |
| 6 | 52.3 | 15.8 | 140.5 | 148.4 |
| 7 | 51.1 | 17.1 | 135.1 | 142.7 |
| 8 | 85.7 | 13.7 | 140.5 | 149.7 |
| 9 | 125.7 | 20.4 ‡ | 144 | 149 |
| 10 | 70.8 | 27.5 ‡ | 144 | 152 |
| 11 | 49.9 | 22.8 ‡ | 141 | 150 |
| 12 | 35.7 | 23.6 ‡ | 142 | 150 |

TABLE 4-continued

Microsphere Properties

| Example | Expanded Density/g dm−3 | Volatile Content/ wt % (1) | Tstart/ ° C. (2) | Tmax/ ° C. (3) |
|---|---|---|---|---|
| 13 | 260 | 12.4 | 135 | 142 |
| 14 | 75.0 | 16.0 | 138.0 | 145.9 |
| 15 | 130 | 10.4 | 137 | 146 |
| 16 | 77 | 23.5 ‡ | 149 | 155 |
| 17 | 97 | 20.3 ‡ | 150 | 155 |
| 18 | 27.4 | 11.7 | 163.0 | 196.3 |
| 19 | 19.9 | 15.2 | 153.4 | 191.8 |
| 20 | 31.5 | 26.7 | 167.0 | 189.5 |
| 21 | 61.9 | 8.0 | 168.8 | 196.0 |
| 22 | 28.2 | — | 163 | 196 |
| 23 | 25.1 | 20.1 ‡ | 170 | 197 |
| 24 | 24.6 | 23.5 | 165 | 196 |
| 25 | 20.3 | 24.7 ‡ | 166 | 197 |
| 26 | 150.5 | 10.8 ‡ | 140 | 147 |
| 27 | 72.7 | 29.7 | 171.5 | 195.3 |
| 28 | 16.4 | 14.2 | 153.5 | 193.3 |
| 29* | § | 9.2 | § | § |
| 30* | >1000 | 8.3 ‡ | § | § |
| 31* | >1000 | 3.0 ‡ | § | § |
| 32* | § | 2.3 ‡ | § | § |
| 33 | 27.9 | 20.1 | 137.5 | 174.4 |
| 34 | 39.4 | 28.2 | 140.0 | 146.9 |
| 35 | 48.1 | 26.3 | 139.5 | 146.6 |
| 36 | 37.7 | 27.7 | 141.5 | 148.9 |
| 37 | 21.9 | 15.5 | 164.0 | 196.6 |
| 38 | 76.6 | 14.3 | 164.5 | 170.6 |
| 39 | 38.4 | — | 169.0 | 183.1 |
| 40 | 44.6 | 17.5 | 165.0 | 198.7 |
| 41* | § | 1.2 | § | § |
| 42 | 25.1 | 12.5 | 201.0 | 219.0 |
| 43 | 30.6 | 20.1 | 153.0 | 194.4 |
| 44 | 25.6 | 18.8 | 176.0 | 181.5 |
| 45 | 18.6 | 20.3 | 173.5 | 183.1 |
| 46 | 8.3 | 32.5 | 162.5 | 186.1 |
| 47* | § | 10.2 | § | § |

(1) Volatile content of the pre-expanded microspheres, measured by TGA
(2) Temperature at which microspheres began to expand
(3) Temperature at which maximum microsphere expansion observed
*Comparative Example
‡ Volatile content measured by headspace GC-MS
— Volatile content was not measured
§ No measurement was made because microscopy showed poor microsphere formation and/or expansion characteristics These data reveal that the carboxylate-functionalised cellulose compositions with higher Tg values, i.e. of 125° C. or more, can be used to make bio-based microspheres. Lower Tg carboxylate-functionalised cellulose materials tend to produce lower yields of microspheres, or poorer quality microspheres. Also, with respect to Examples 31 and 32, use of a non-carboxylate-functionalised cellulose also resulted in microspheres with poor expansion characteristics.

Figure 2A:
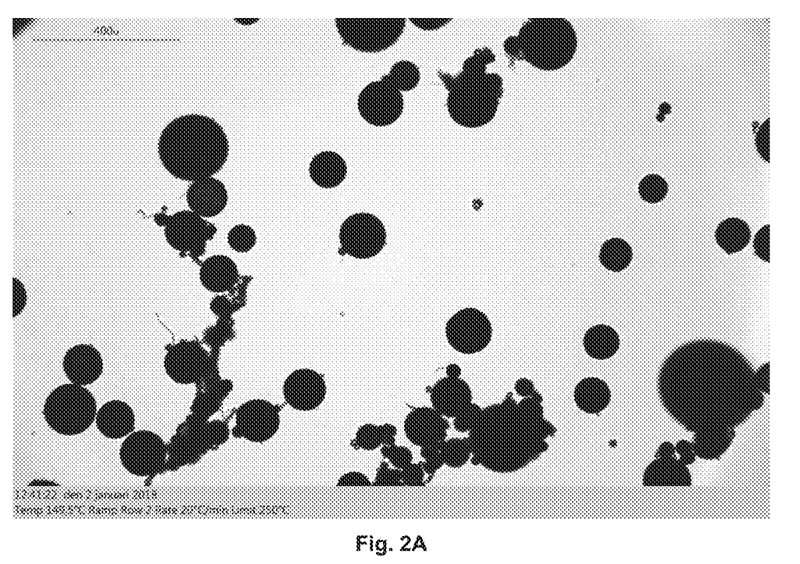
Figure 2B:
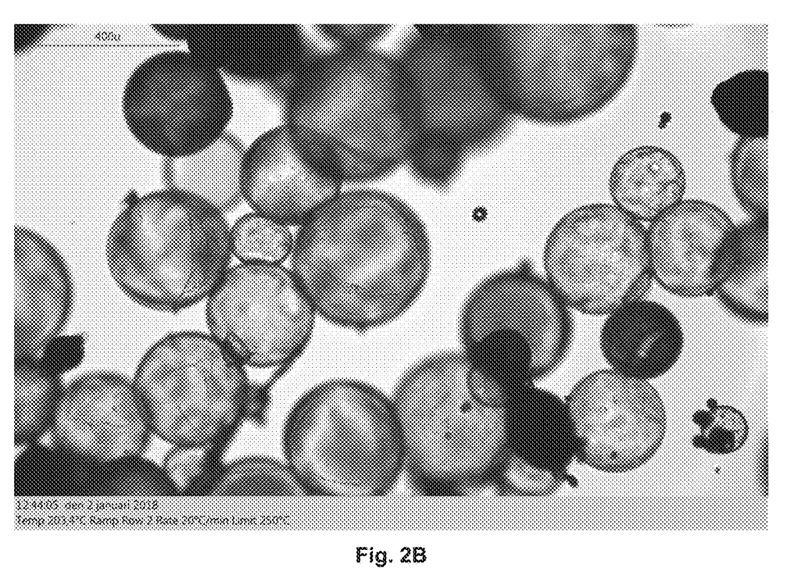
Figure 3A:
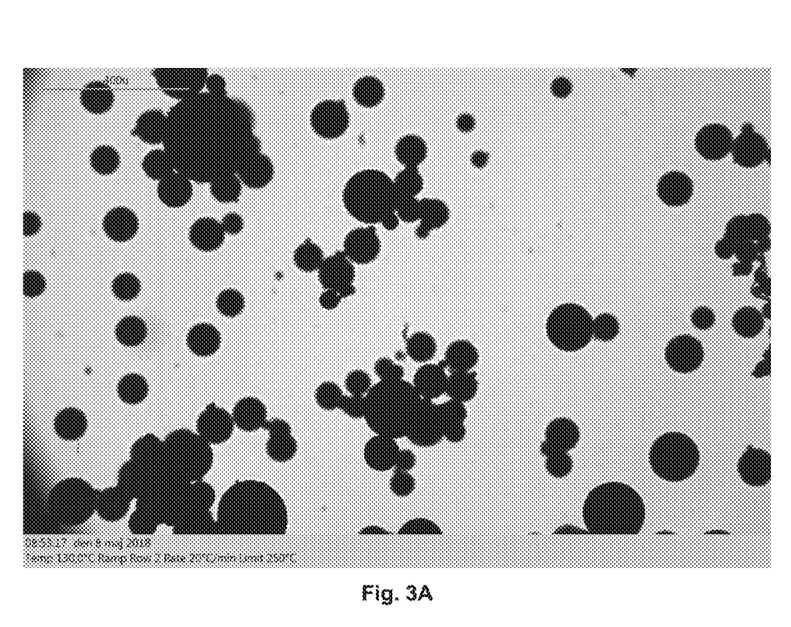
Figure 3B:
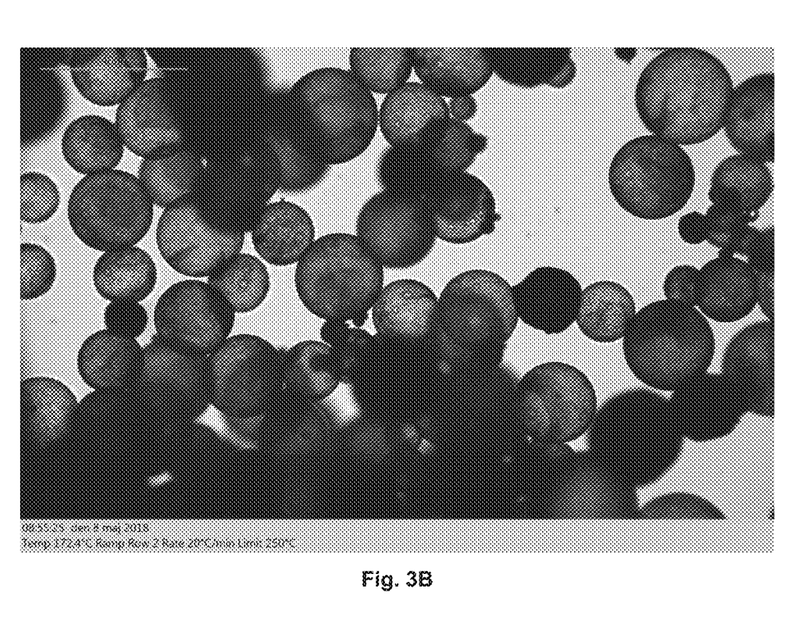
Figure 4A:
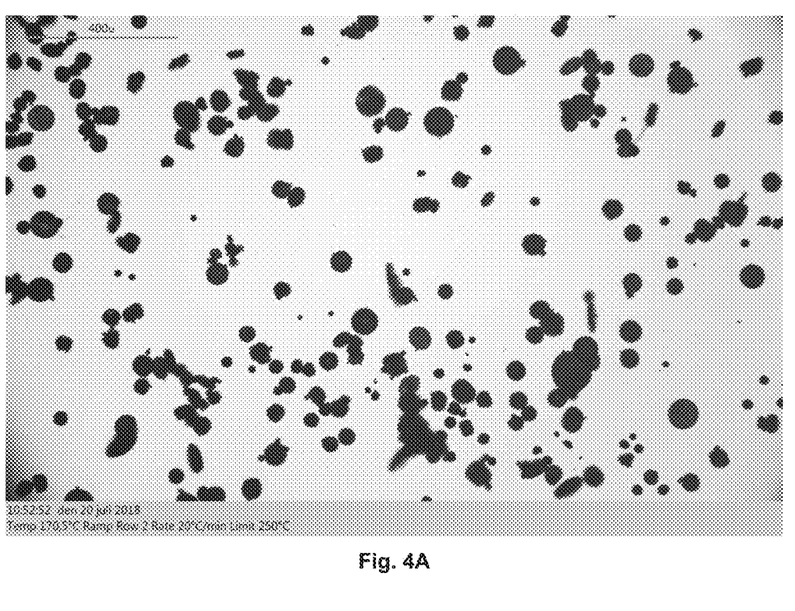
Figure 4B:
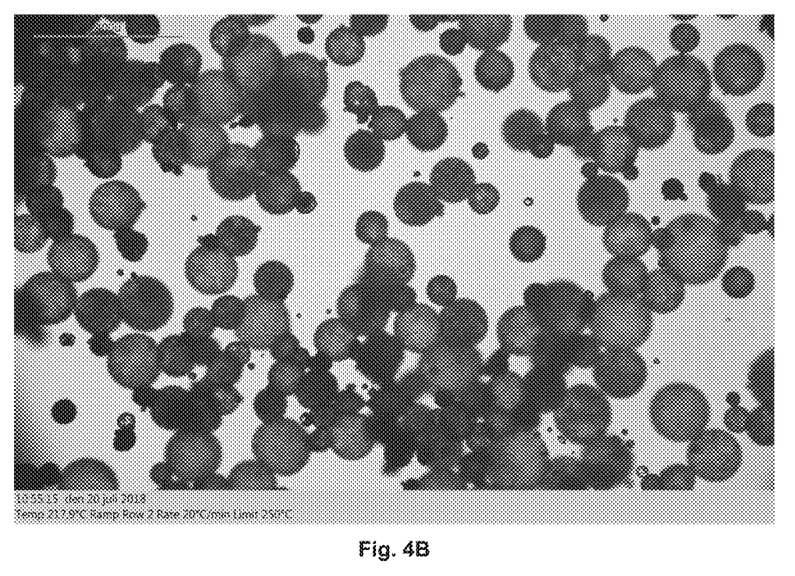
Figure 5A:
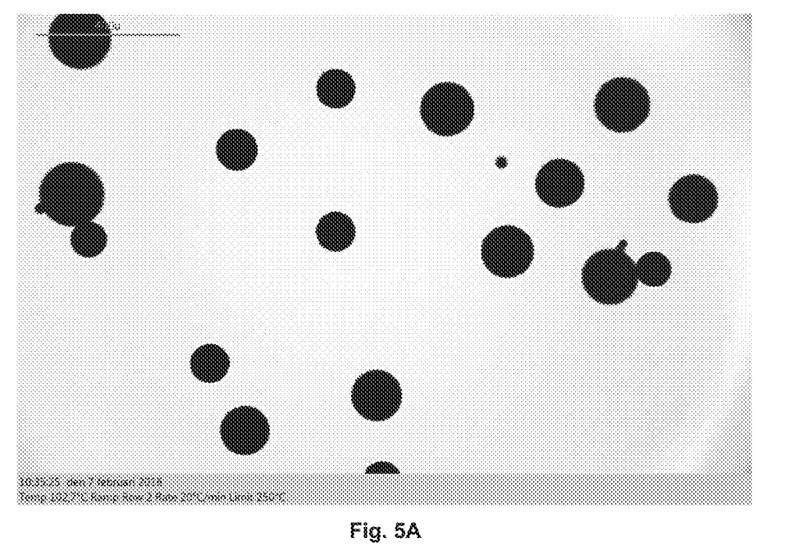
Figure 5B:
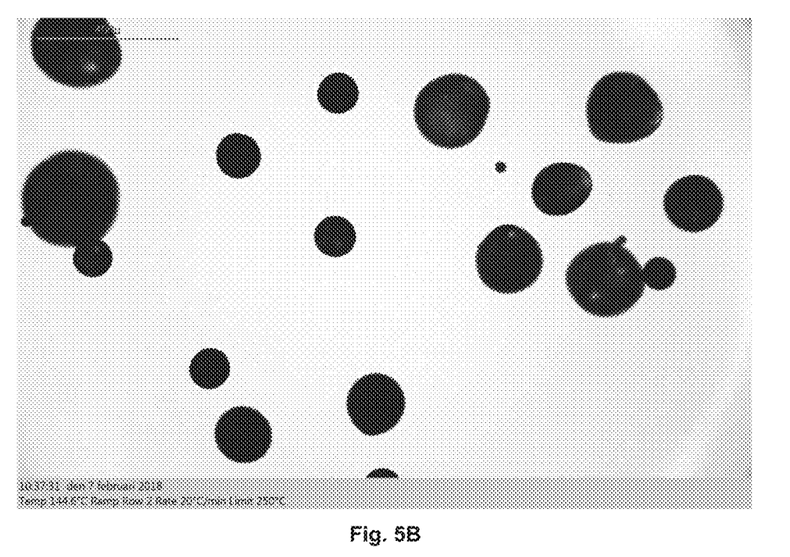
Figure 6A:
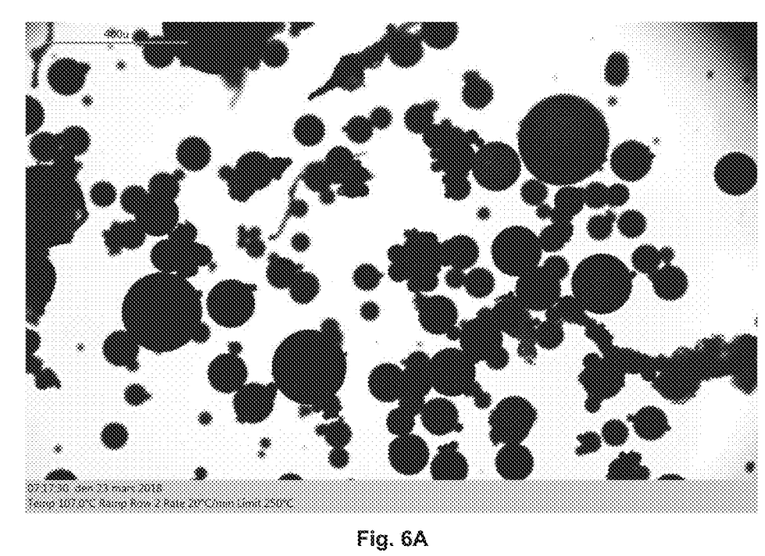
Figure 6B:
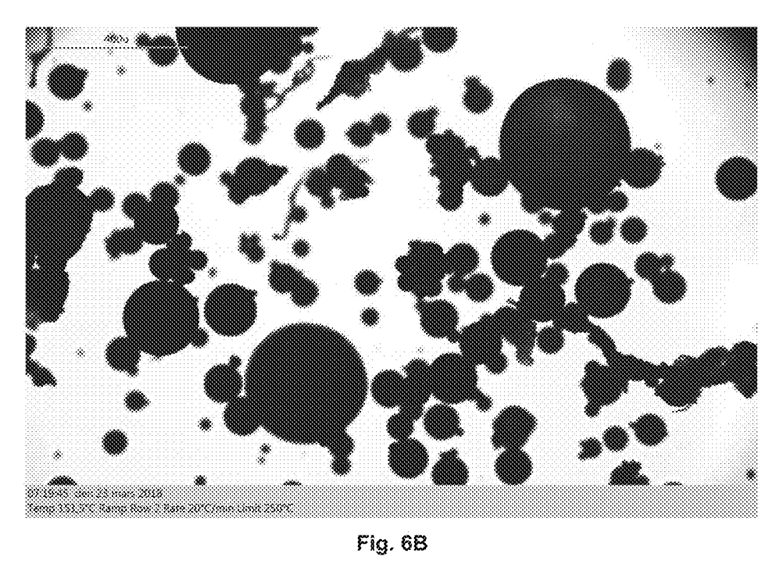

Photomicrographs of some representative samples are shown in the drawings. FIGS. 2 to 4 show examples of samples which showed good microsphere expansion characteristics (Examples 40, 12 and 4 respectively). FIGS. 5 and 6 show samples where microsphere formation was evident, but expansion characteristics or sample quality were poor (Examples 47 and 32 respectively).

In FIGS. 5 and 6, for example, it is clear that microsphere expansion is inconsistent, where only larger microspheres seem to expand.

The expansion properties of Examples 22 to 25 were evaluated immediately after their preparation, and also 1 month and 4 months later. Results are shown in Table 5, which highlight that the microspheres can be stored for a number of months without substantial loss of expansion performance.

TABLE 5

Expansion Performance with Time

| Parameter | Example 22 | Example 23 | Example 24 | Example 25 |
|---|---|---|---|---|
| D (0 months) | 28.2 | 25.1 | 24.6 | 20.3 |
| D (1 month) | 44 | 23 | 18 | 25 |
| D (4 month) | 47 | 35 | 26 | 40 |
| Tstart (0 months) | 163 | 170 | 165 | 166 |
| Tstart (1 month) | 169 | 166 | 168 | 164 |
| Tstart (4 months) | 163 | 167 | 167 | 165 |
| Tmax (0 months) | 196 | 197 | 196 | 197 |
| Tmax (1 month) | 194 | 194 | 197 | 198 |
| Tmax (4 months) | 193 | 196 | 196 | 197 |
| IO (0 months) | — | 20.1 | 25.0 | 24.7 |
| IO (1 month) | 19.3 | 19.6 | 20.1 | 16.7 |

D = Density (g dm−3) after expansion
Tstart and Tmax are in ° C.
IO = amount of isooctane in microspheres (wt %)
0, 1 or 4 months means number of months after synthesis Table 6 shows light scattering data for pre-expanded microspheres that were collected using a Malvern Mastersizer 2000 device.

TABLE 6

Light Scattering Data

| Example | Volume mean diameter [D(0.5)]/μm | Volume span [{D(0.9) − D(0.1)}/D(0.5)] |
|---|---|---|
| 3 | 43.0 | 8.0 |
| 13 | 83.3 | 5.7 |
| 14 | 109.0 | 1.7 |
| 15 | 144.6 | 1.9 |
| 27 | 118.6 | 1.4 |
| 28 | 146.7 | 1.9 |
| 33 | 347.1 | 2.8 |
| 35 | 137.3 | 6.3 |
| 42 | 14.5 | 2.4 |
| 43 | 72.0 | 2.8 |
| 44 | 305.7 | 1.4 |
| 45 | 338.7 | 1.7 |
| 46 | 360.0 | 1.4 |

Table 7 shows data of expanded microsphere characteristics based on microscopy and image analysis.

TABLE 7

Data from Image Analysis

| Example | Number of spheres analysed | Volume average diameter [D(0.5)]/μm |
|---|---|---|
| 1 | 689 | 194 |
| 9 | 591 | 153 |
| 10 | 795 | 156 |
| 11 | 885 | 208 |
| 12 | 1220 | 182 |
| 16 | 476 | 220 |
| 17 | 417 | 283 |
| 22 | 669 | 242 |
| 23 | 999 | 230 |
| 24 | 440 | 205 |
| 25 | 312 | 264 |
| 26 | 1467 | 152 |

Tables 8-9 show data for microspheres made from blends of polymers (Examples 48 to 55). In all cases, the solvent used was a mixture of 5.0 g each of ethyl acetate and methyl acetate. Expandable microspheres were successfully obtained.

TABLE 8

Compositional Data for Microspheres with Mixed Polymer Shells

| Example | Method Used | Polymer 1 (wt) | Polymer 2 (wt) (1) | Blowing Agent (wt) (2) | Wt. Water | Surfactant (wt) |
|---|---|---|---|---|---|---|
| 48 | 1 | CAP2 (1.0 g) | CAB5 (0.1 g) | IO (0.50 g) | 137.0 g | A (13.0 g) |
| 49 | 1 | CAP2 (1.0 g) | CAB4 (0.1 g) | IO (0.50 g) | 137.0 g | A (13.0 g) |
| 50 | 1 | CAP2 (1.0 g) | PPC (0.1 g) | IO (0.57 g) | 108.0 g | A (42.0 g) |
| 51 | 1 | CAP2 (1.0 g) | PPC (0.1 g) | IO (0.32 g) | 108.0 g | A (42.0 g) |
| 52 | 1 | CAP2 (1.05 g) | PCL (0.05 g) | IO (0.32 g) | 108.0 g | A (42.0 g) |
| 53 | 1 | CAP2 (1.0) | PCL (0.1 g) | IO (0.32 g) | 108.0 g | A (42.0 g) |
| 54 | 1 | CAP2 (1.0 g) | Levamelt 900 (0.1 g) | IO (0.45 g) | 108.0 g | A (42.0 g) |
| 55 | 1 | CAP2 (1.0 g) | PVPVA (0.1 g) | IO (0.35 g) | 108.0 g | A (42.0 g) |

(1) PPC, PCL, Levamelt 900 and PVPVA are defined below.
(2) IO = isooctane

Levamelt™ 900 is from Arlanxeo Deutschland GmbH, and is a co-polymer of ethylene and vinyl acetate with vinyl acetate content of 90 wt %. The Tg is 21° C.

PVPVA is poly(vinylpyrrolidone-co-vinylacetate) obtained from Aldrich, as a solution in isopropanol. The molecular weight, Mw, is about 13000. The measured Tg value was 73° C. Before use, the isopropanol was removed by drying to form a powder.

PPC is polypropylene carbonate obtained from Sigma Aldrich, with an average molecular weight, Mn, of 50000.

PCL is polycaprolactone obtained from Sigma Aldrich, with an average molecular weight Mn of 80000.

TABLE 9

Properties of Microspheres with Mixed Polymer Shells

| Example | Expanded Density/g dm−3 | Volatile Content/ wt % (1) | Tstart/ ° C. (2) | Tmax/ ° C. (3) |
|---|---|---|---|---|
| 48 | 59.2 | 11.1 | 135 | 146 |
| 49 | 33.1 | 12.6 | 135 | 170 |
| 50 | 56.4 | 30.6 | 140 | 146 |
| 51 | 35.6 | 19.1 | 143 | 150 |
| 52 | 81.3 | 15.6 | 142 | 157 |
| 53 | 105.5 | 13.6 | 138 | 146 |
| 54 | 43.2 | nd | 138 | 146 |
| 55 | 65.2 | 16.0 | 137 | 145 |

(1) Volatile content of the pre-expanded microspheres, measured for Examples 48 and 49 by headspace GC-MS and for Examples 50-53 and 55 by GC-FID;
nd = not determined
(2) Temperature at which microspheres began to expand
(3) Temperature at which maximum microsphere expansion observed While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. Thermally expandable microspheres comprising a polymeric shell surrounding a hollow core, wherein the hollow core comprises a blowing agent, the polymeric shell comprises a carboxylate-functionalised cellulose having a glass transition temperature (Tg) of at least 141° C., and the microspheres have an expanded density of from about 8.3 to about 260 g/cm³.

2. The thermally expandable microspheres as claimed in claim 1, in which the carboxylate group is of Formula (I)

Formula (1)

where;

A is selected from —H, —OH, —ORb, —C(O)OH and —C(O)ORb;

Ra is selected from saturated or unsaturated aliphatic groups having from about 1 to about 11 carbon atoms, which can be linear, branched or cyclic; and from 5- and 6-membered aromatic rings; wherein Ra is optionally substituted with one or more substituents selected from —OH, halide, C1-4 alkyl, and C1-4 alkoxy, in which the C1-4 alkyl and C1-4 alkoxy groups are optionally substituted with one or more groups selected from halide and —OH; and Rb on each occurrence is independently selected from a C1-4 alkyl group, optionally with one or more substituents selected from halide and —OH groups.

3. The thermally expandable microspheres as claimed in claim 2, in which one or more of the following conditions apply:
(a) A is selected from H and C(O)OH;
(b) Ra comprises from about 1 to about 7 carbon atoms;
(c) Ra is selected from (i) saturated linear or branched aliphatic $C_vR_{2v}^c$ groups; (ii) cyclic $C_wR_{2w-2}^c$ aliphatic groups, (iii) unsaturated linear or branched aliphatic $C_xR_{2x-2y}^c$ groups comprising "y" double bonds; (iv) unsaturated cyclic aliphatic $C_wR_{2w-2y-2}^c$ group comprising "y" double bonds; and (v) $C_zR_{z-2}^c$ aromatic groups where;
v is an integer in the range of from about 1 to about 11;
w is an integer in the range of from about 3 to about 11;
x is an integer in the range of from about 2 to about 11;
y is about 1 or about 2;
z is about 5 or about 6 and
Rc on each occurrence is independently selected from H, —OH, halide,
C1-4 alkyl, and C1-4 alkoxy, where the C1-4 alkyl and C1-4 alkoxy groups are optionally substituted with one or more groups selected from halide and —OH;

(d) Ra is selected from $C_pR_{2p-2q}{}^c$–E–$C_rR_{2r-2s}{}^c$ groups having no more than 11 carbon atoms, where;
E is $C_wR_{2w-2}{}^c$, $C_wR_{2w-2y-2}{}^c$, or $C_zR_{z-2}{}^c$ as defined in (c) above;
p and r are each independently a whole number from about 0 to about 8, and p+r is at least about 1;
q and s are each the number of double bonds in the respective non-cyclic aliphatic component, each independently selected from about 0, about 1 and about 2.

4. The thermally expandable microspheres of claim 3, in which the carboxylate functionality on the carboxylate-functionalised cellulose is selected from optionally substituted C1-C8 aliphatic carboxylate groups and carboxylate groups comprising an optionally substituted C6 aromatic ring.

5. The thermally expandable microspheres of claim 4, in which the carboxylate functionality is selected from acetate, propionate, butyrate, pentanoate, hexanoate, heptanoate, octanoate and phthalate.

6. The thermally expandable microspheres of claim 1, in which one or more of the following conditions apply;
(a) the number average molecular weight (Mn) of the carboxylate-functionalised cellulose is in the range of from about 1 000 to about 700 000;
(b) the microspheres have an expanded density of from about 8.3 to about 125 g/cm³;
(c) the Tg of the carboxylate-functionalised cellulose is no more than about 215° C.

7. The thermally expandable microspheres of claim 1, in which the blowing agent has a boiling point above about 25° C. at about 5.0 bara pressure.

8. The thermally expandable microspheres of claim 7, in which one or more of the following conditions apply:
(a) the blowing agent has a boiling point above about 25° C. at about 3.0 bara pressure or at about 1.013 bara pressure;
(b) the blowing agent has a boiling point of about 250° C. or less at about 1.013 bara pressure;
(c) the blowing agent is selected from (i) dialkyl ethers with alkyl groups each selected from $C_2$ to $C_5$ alkyl, (ii) C4 to C12 alkanes and (iii) C2 to C12 haloalkanes.

9. The thermally expandable microspheres of claim 8, in which the blowing agent is selected from C8 to C12 isoalkanes.

10. The thermally expandable microspheres of claim 1, wherein the blowing agent is isooctane and is present in the microspheres in an amount of from about 5 to about 50 wt %.

11. A process for preparing thermally expandable microspheres, comprising mixing an aqueous phase that optionally comprises an emulsifier with an organic phase that comprises an organic solvent, a blowing agent and a carboxylate-functionalised cellulose having a Tg of at least 141° C., to form a dispersion of microspheres having a polymeric shell surrounding a hollow core, in which the polymeric shell comprises the carboxylate-functionalised cellulose, and the hollow core comprises the blowing agent and wherein the microspheres have an expanded density of from about 8.3 to about 260 g/cm³.

12. The process as claimed in claim 11, in which the aqueous phase is pre-saturated with one or more organic solvents in which the carboxylate-functionalised cellulose is soluble.

13. The process as claimed in claim 11, in which one or more of the following conditions apply;
(a) the emulsifier is selected from unmodified colloidal silica, organosilane-modified colloidal silica, anionic surfactants, cationic surfactants, non-ionic surfactants, amphoteric surfactants, zwitterionic surfactants, and polyvinyl alcohols;
(b) the solvent is selected from esters, amides, ketones, alcohols and ethers having from about 1 to about 10 carbon atoms;
(c) the carboxylate-functionalised cellulose content of the organic phase is in the range of from about 0.1 to about 50 wt %;
(d) the blowing agent content of the organic phase is in the range of from about 0.5 to about 20 wt %;
(e) the emulsifier content of the aqueous phase is in the range of from about 0.01 to about 20 wt %;
(f) the organic phase content of the mixture between the organic phase and the aqueous phase is in the range of from about 0.1 to about 45 wt %;
(g) the carboxylate-functionalised cellulose;
has a carboxylate group of Formula (I)

Formula (I)

where;
A is selected from —H, —OH, —ORb, —C(O)OH and —C(O)ORb;
Ra is selected from saturated or unsaturated aliphatic groups having from about 1 to about 11 carbon atoms, which can be linear, branched or cyclic; and from 5- and 6-membered aromatic rings; wherein Ra is optionally substituted with one or more substituents selected from —OH, halide, C1-4 alkyl, and C1-4 alkoxy, in which the C1-4 alkyl and C1-4 alkoxy groups are optionally substituted with one or more groups selected from halide and —OH; and
Rb on each occurrence is independently selected from a C1-4 alkyl group, optionally with one or more substituents selected from halide and —OH groups;
(h) the blowing agent has a boiling point above about 25° C. at about 5.0 bara pressure; and/or
(i) the thermally expandable microspheres are separated from the mixture.

14. The process as claimed in claim 11, in which the expandable microspheres are subsequently expanded by heat treatment to form expanded microspheres.

15. The thermally expandable microspheres of claim 2, in which one or more of the following conditions apply;
(a) the number average molecular weight (Mn) of the carboxylate-functionalised cellulose is in the range of from about 1 000 to about 700 000;
(b) the microspheres have an expanded density of from about 8.3 to about 125 g/cm³;
(c) the Tg of the carboxylate-functionalised cellulose is no more than about 215° C.

16. The thermally expandable microspheres of & claim 3, in which one or more of the following conditions apply;
(a) the number average molecular weight (Mn) of the carboxylate-functionalised cellulose is in the range of from about 1 000 to about 700 000;
(b) the microspheres have an expanded density of from about 8.3 to about 125 g/cm³;
(c) the Tg of the carboxylate-functionalised cellulose is no more than about 215° C.

17. The thermally expandable microspheres of claim 4, in which one or more of the following conditions apply;

(a) the number average molecular weight (Mn) of the carboxylate-functionalised cellulose is in the range of from about 1 000 to about 700 000;
(b) the microspheres have an expanded density of from about 8.3 to about 125 g/cm$^3$;
(c) the Tg of the carboxylate-functionalised cellulose is no more than about 215° C.

18. The thermally expandable microspheres of claim 5, in which one or more of the following conditions apply;
(a) the number average molecular weight (Mn) of the carboxylate-functionalised cellulose is in the range of from about 1 000 to about 700 000;
(b) the microspheres have an expanded density of from about 8.3 to about 125 g/cm$^3$;
(c) the Tg of the carboxylate-functionalised cellulose is no more than about 215° C.

19. Thermally expandable microspheres comprising a polymeric shell surrounding a hollow core, wherein the hollow core comprises a blowing agent that is isooctane and the polymeric shell comprises a carboxylate-functionalised cellulose having a glass transition temperature (Tg) of from 141° C. to about 192° C. and selected from the group consisting of cellulose acetates, cellulose acetate propionates, cellulose acetate butyrates, and combinations thereof, and wherein the microspheres have an expanded density of from about 8.3 to about 125 g/cm$^3$.

20. The thermally expandable microspheres of claim 1 wherein the carboxylate-functionalised cellulose is free of cellulose acetate butyrates.

\* \* \* \* \*